(12) United States Patent
Mannige et al.

(10) Patent No.: US 11,520,976 B1
(45) Date of Patent: Dec. 6, 2022

(54) AGENT-ASSISTED DIGITAL FORM FILLING

(71) Applicant: AccelTree Software Private Limited, Pune (IN)

(72) Inventors: Vivek Mannige, Pune (IN); Parth Abhyankar, Pune (IN)

(73) Assignee: ACCELTREE SOFTWARE PRIVATE LIMITED, Pune (IN)

( * ) Notice: Subject to any disclaimer, the term of this patent is extended or adjusted under 35 U.S.C. 154(b) by 0 days.

(21) Appl. No.: 17/399,733

(22) Filed: Aug. 11, 2021

(51) Int. Cl.
*G06F 40/174* (2020.01)
*G06F 3/0482* (2013.01)

(52) U.S. Cl.
CPC .......... *G06F 40/174* (2020.01); *G06F 3/0482* (2013.01)

(58) Field of Classification Search
CPC .............................. G06F 40/174; G06F 3/0482
See application file for complete search history.

(56) References Cited

U.S. PATENT DOCUMENTS

| | | | | |
|---|---|---|---|---|
| 2007/0214162 A1* | 9/2007 | Rice | | G06F 16/2308 |
| 2011/0093769 A1* | 4/2011 | Dunn | | G06F 40/174 |
| | | | | 715/221 |
| 2012/0089631 A1* | 4/2012 | Poon | | G06F 16/282 |
| | | | | 707/769 |
| 2018/0246747 A1* | 8/2018 | Asayag | | G06F 9/45533 |
| 2019/0018661 A1* | 1/2019 | Srinivasan Natesan | .. | G06F 8/38 |
| 2019/0163341 A1* | 5/2019 | Jeon | | G06F 3/0488 |

* cited by examiner

*Primary Examiner* — Seth A Silverman
(74) *Attorney, Agent, or Firm* — Preston Smirman; Smirman IP Law, PLLC

(57) ABSTRACT

A method and device for agent-assisted digital form filling are described. An agent device assists a user in digital form filling and involves various steps. One step involves providing a user device operated by a user with access to a first digital form that contains a field that can be modified by the user. Another step involves identifying a modification to the field by the user. Another step involves displaying the modification in a second digital form residing on the agent device. The second digital form also contains the field, and is capable of accessing functionality that the first digital form is not capable of accessing. Another step involves analyzing the modification using the functionality the second digital form is capable of accessing. The agent can make a modification to a field in the second digital form and the agent's modification can be displayed in the first digital form.

20 Claims, 6 Drawing Sheets

Agent Device
300

AGENT-ASSISTED DIGITAL FORM FILLING

FIELD OF THE INVENTION

This application relates generally to agent-assisted digital form filling.

BACKGROUND OF THE INVENTION

Digital forms are electronic documents that are used to collect data. Digital forms are used throughout society for a variety of purposes, such as applying for insurance or applying for a loan. Sometimes, the filling of a digital form can be collaborative in nature. For example, an insurance agent can be in the same room as an insurance applicant and can help the insurance applicant fill a digital form (or a paper form, whose information is later input into a digital form).

SUMMARY OF THE INVENTION

One aspect features a non-transitory computer readable storage medium comprising a computer readable program. The computer readable program when executed on an agent device operated by an agent causes the agent device to assist a user in digital form filling. Assisting the user in digital form filling involves various steps. One step involves providing a user device operated by a user with access to a first digital form. The first digital form contains a field that can be modified by the user. Another step involves identifying a modification to the field by the user. Another step involves displaying the modification in a second digital form residing on the agent device. The second digital form also contains the field, and is capable of accessing functionality that the first digital form is not capable of accessing. Another step involves analyzing the modification using the functionality the second digital form is capable of accessing.

Another aspect features a method of agent-assisted digital form filling. The method comprises various steps. One step involves providing, by an agent device operated by an agent, a user device with access to a first digital form. The user device is operated by a user, and the first digital form contains a field that can be modified by the user. Another step involves identifying, by the agent device, a modification to the field by the user. Another step involves displaying, by the agent device, the modification in a second digital form residing on the agent device. The second digital form also contains the field, and is capable of accessing functionality that the first digital form is not capable of accessing. Another step involves analyzing, by the agent device, the modification using the functionality the second digital form is capable of accessing.

Another aspect features an agent device capable of being operated by an agent. The agent device comprises a processor and memory storing computer-readable instructions that, when executed by the processor, cause the agent device to assist a user in digital form filling. Assisting the user in digital form filling involves various steps. One step involves providing a user device operated by a user with access to a first digital form. The first digital form contains a field that can be modified by the user. Another step involves identifying a modification to the field by the user. Another step involves displaying the modification in a second digital form residing on the agent device. The second digital form also contains the field, and is capable of accessing functionality that the first digital form is not capable of accessing. Another step involves analyzing the modification using the functionality the second digital form is capable of accessing.

Another aspect features a non-transitory computer readable storage medium comprising a computer readable program. The computer readable program when executed on an agent device operated by an agent causes the agent device to perform various steps. One step involves providing a user device with access to a first digital form. The user device is operated by a user, and the first digital form contains a field that can be modified by the user. Another step involves displaying a second digital form on the agent device. The second digital form resides on the agent device and also contains the field. The second digital form is capable of accessing functionality that the first digital form is not capable of accessing. Another step involves receiving an agent's modification to the field in the second digital form. The agent's modification is made by the agent. Another step involves instructing the user device to display the agent's modification in the field in the first digital form.

In some implementations, analyzing the modification using the functionality the second digital form is capable of accessing involves identifying errors in the modification. In some implementations, when an error is identified, the agent device sends an error alert to the user device.

In some implementations, analyzing the modification using the functionality the second digital form is capable of accessing involves using the modification to determine the value of a second field. In some implementations, the value of the second field is displayed in the first digital form and the second digital form.

In some implementations, the field can no longer be modified after the agent device analyzes the modification using the functionality the second digital form is capable of accessing.

In some implementations, the user is using the first digital form as part of an insurance application procedure.

In some implementations, the modification is only accessible to the user and the agent, and is not accessible to a third-party server.

In some implementations, the field is selected from the group consisting of: (i) drop-down list field; (ii) radio button field; (iii) text field; (iv) calendar field; (v) image field; (vi) check box field; and (vii) button field.

In some implementations, the field in the second digital form can be modified by the agent. In some implementations, the agent device identifies an agent's modification to the field in the second digital form and instructs the user device to display the agent's modification in the field in the first digital form.

In some implementations, the first digital form is not capable of accessing functionality capable of identifying errors in the modification made by the user, and the second digital form is capable of accessing functionality capable of identifying errors in the modification.

DETAILED DESCRIPTION OF THE INVENTION

Figure 1:
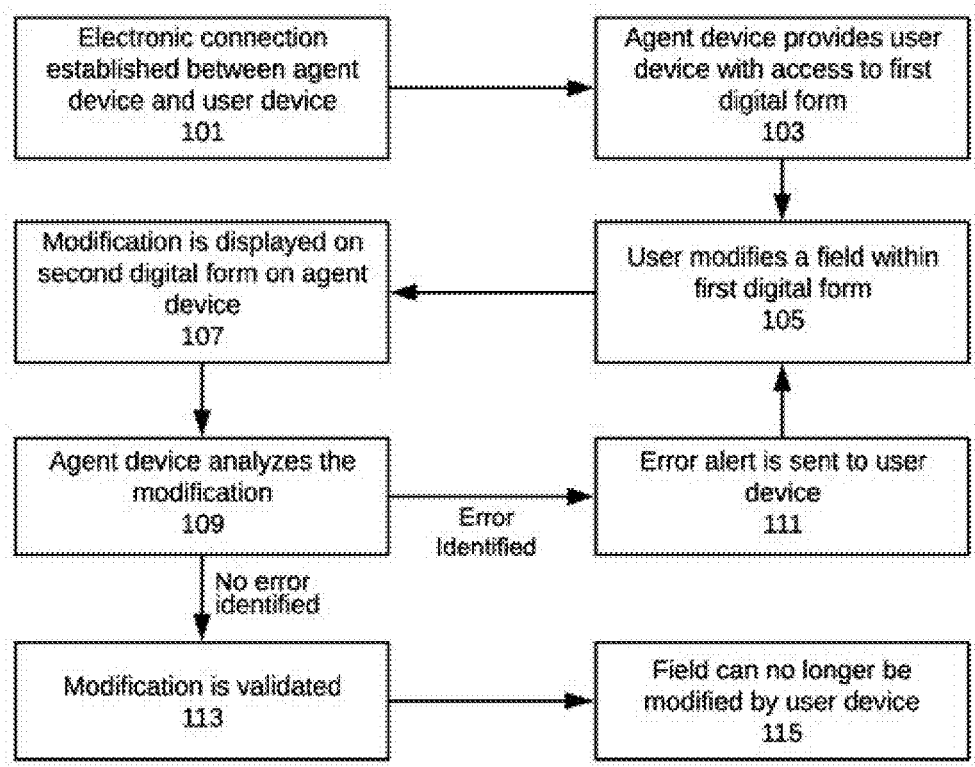
FIG. 1 is a block/flow diagram showing a method of agent-assisted digital form filling using an agent device operated by an agent and a user device operated by a user.
Figure 4:
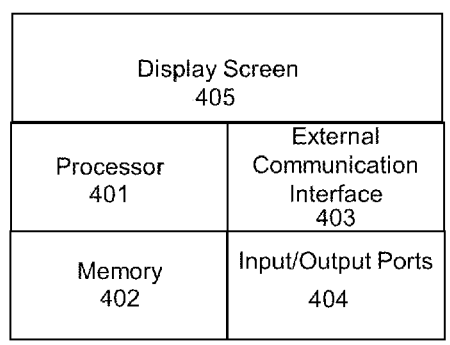
FIG. 4 is a block diagram illustrating an embodiment of an agent device.
Figure 5:
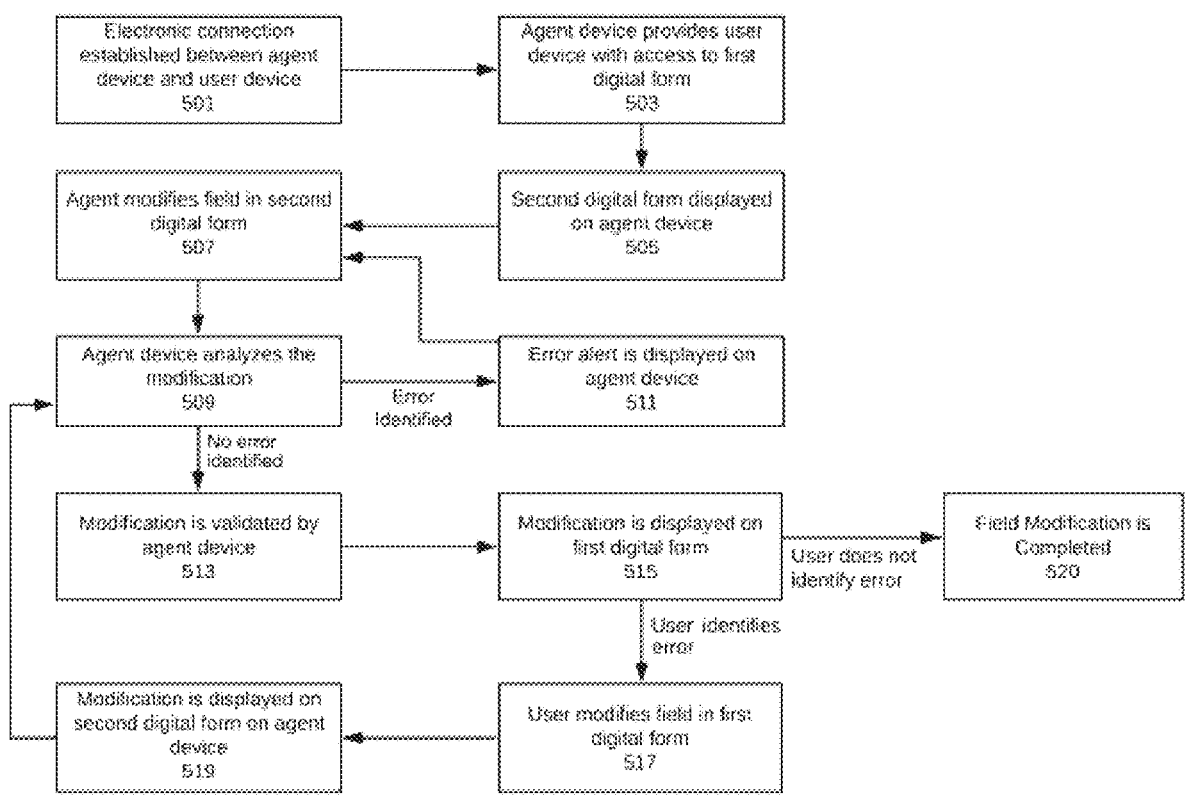
FIG. 5 is a block/flow diagram showing a method of agent-assisted digital form filling using an agent device operated by an agent and a user device operated by a user.

As described herein, an agent device 300 (see FIG. 4) can be used by an agent to assist a user in the process of filling out a digital form (see FIGS. 1, 5). The agent device 300 can be assisting the user in a variety of different scenarios. For example, in some embodiments, the agent can be an insurance agent who is helping the user apply for insurance. As another example, in some embodiments, the agent can be a healthcare worker who is helping a patient convey personal and medical information. As yet another example, in some embodiments, the agent can be an agent of a bank or other lender who is helping the user apply for a loan.

Certain implementations may have particular advantages. For example, some implementations can allow an agent to assist a user in filling a digital form even though the user and the agent are in different locations. As another example, where the agent's version of the digital form is capable of accessing functionality that the user's version of the digital form cannot, the agent maintains control over that functionality and this enables a consistent and accurate process for digital form filling. As another example, some implementations allow for the user's identifying information to be transmitted privately to the agent without using functionality residing on a server, and this can result in (i) protecting the privacy of the user, and (ii) preventing an agent's competitors from identifying the user as a potential customer/applicant. In these implementations, an intermediate server cannot access the user's modifications (including identifying information) because either (i) the modifications are never sent to an intermediate server, or (ii) if the modifications are sent to an intermediate server, then the functionality to access the information reflected in the modifications (such as decryption functionality, which may be utilized but need not be utilized) resides only at the agent's device (or in the agent's second digital form). As another example, some implementations allow for rapid completion of a digital form and rapid verification of the fields in a digital form, at least in part because these implementations do not need to access functionality residing on a server in order to verify a field. As another example, some implementations allow an agent to assist a user when the user is having difficulty completing a digital form. Other aspects, features, and advantages will be apparent from the following detailed description, the drawings, and the claims.

Figure 3:
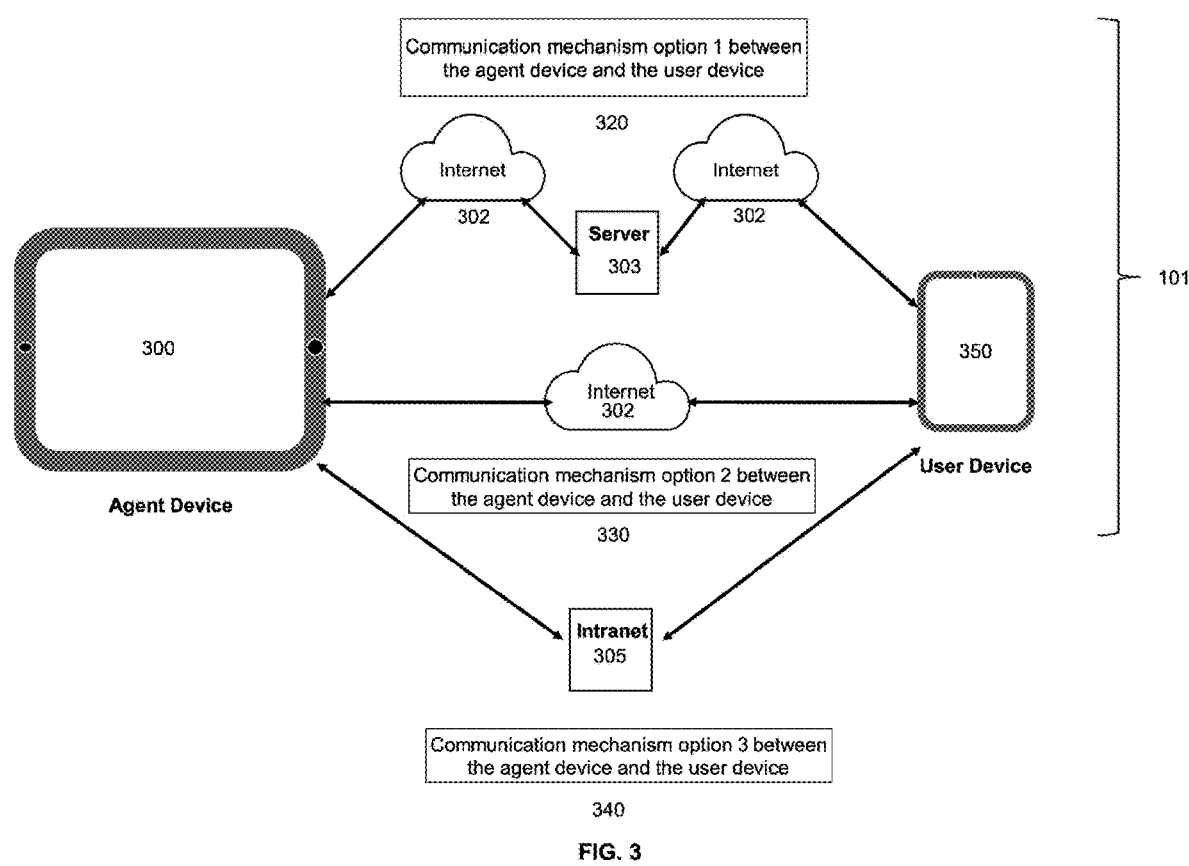
FIG. 3 is a cartoon diagram illustrating three embodiments for establishing a connection between a user device operated by a user and an agent device operated by an agent.

FIG. 1 shows a block-flow diagram illustratively depicting one embodiment of a method for assisting a user in the process of filling out a digital form. Referring to FIGS. 1 and 3, the first step 101 of the method shown in FIG. 1 involves establishing an electronic connection between an agent device 300 (operated by an agent) and a user device 350 (operated by a user). As shown in FIG. 3, various methods exist for establishing a connection between the agent device 300 and the user device 350. For example, using communication method 320, the agent device 300 and the user device 350 establish a connection through a server 303 and the internet 302. As another example, using communication method 330, the agent device 300 and the user device 350 can establish a connection using only the internet 302. As yet another example, the agent device 300 and the user device 350 can establish a connection via an intranet network 340. Once a connection is established, the agent device 300 may facilitate various methods of verbal communication, such as telephonic communication and videoconferencing.

Referring to FIGS. 3-4, the agent device 300 can be a cell phone, laptop computer, tablet computer, desktop computer, etc. Likewise, the user device 350 can be a cell phone, laptop computer, tablet computer, desktop computer, etc. The agent device 300 shown in FIG. 4 is one embodiment of an agent device that can implement the steps of the methods shown in FIGS. 1 and 5. The agent device 300 can execute a computer program, which can be written in any programming language (including compiled or interpreted languages, or declarative or procedural languages). The computer program can be deployed in any form, e.g., as a stand-alone program or as a module, component, subroutine, etc. for use in a computing environment. The agent device 300 generally contains a central processing unit (in addition to other processors) 401 that will receive instructions and data from a read-only memory or a random access memory or both (or any other type of memory) 402, including computer-readable media suitable for storing computer program instructions, which can include all forms of non-volatile memory, media and memory devices, including by way of example semiconductor memory devices, for example, EPROM, EEPROM, and flash memory devices; magnetic disks, for example, internal hard disks or removable disks; and CD-ROM and DVD-ROM disks. The processor and memory can be supplemented by, or incorporated in, special purpose logic circuitry. The agent device 300 can also have an external communication interface 403, such as an antenna, network interface card, speakers, wireless internet adapter, etc. The agent device 300 can also have input/output ports, such as a USB, USB-C, Ethernet, HDMI, SD Card Reader, audio jack, etc. The agent device 300 can have a display screen 405, such as an LCD (liquid crystal display) or LED (light emitting diode) screen or monitor, for displaying information to the user. The user device 350 can also have any of the aforementioned features.

Referring to FIGS. 1-3, in step 103, the agent device 300 provides the user device 350 with access to a first digital form 200. Access to the first digital form 200 can be provided in various ways. For example, in some embodiments, access to the first digital form 200 can be provided through a link to a website. For example, the agent device 300 can have the capability of sending an email or text message to the user device 350, where the email or text message contains a URL, or a link to an URL. The URL for accessing the first digital form 200 can be password-protected, e.g., using a one-time-password. As another example, access to the first digital form 200 could be provided through a peer-to-peer link established through the internet.

Figure 2A:
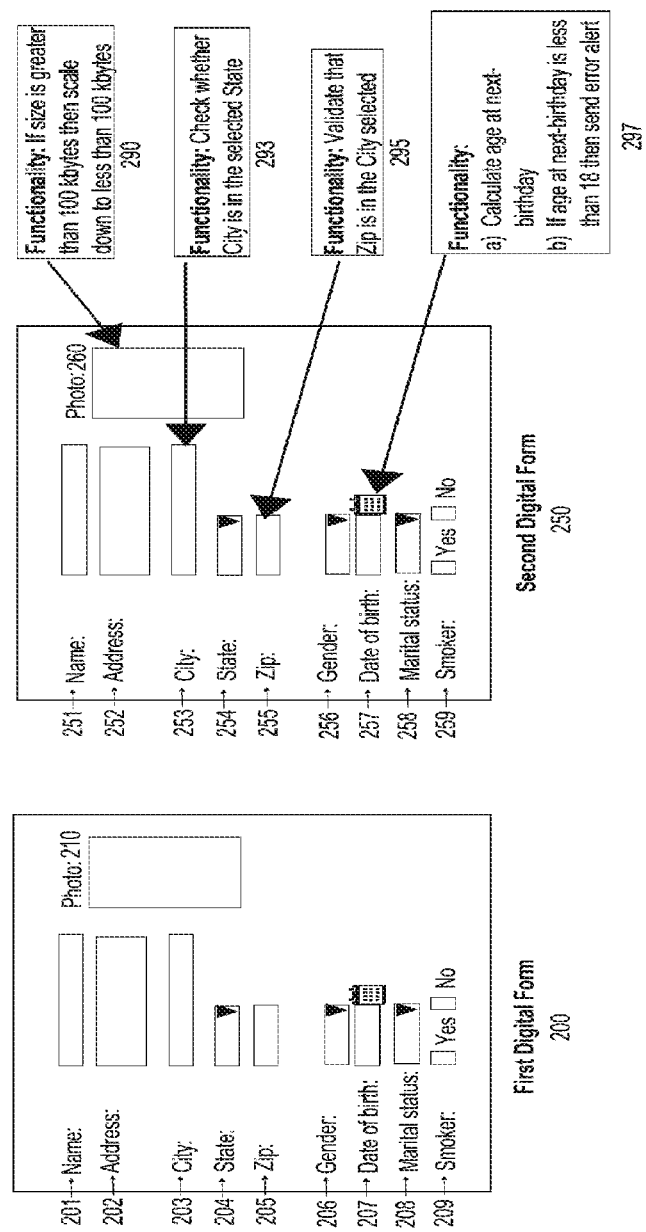
FIGS. 2A and 2B illustrate an embodiment of a first digital form and an embodiment of a second digital form.
Figure 2B:
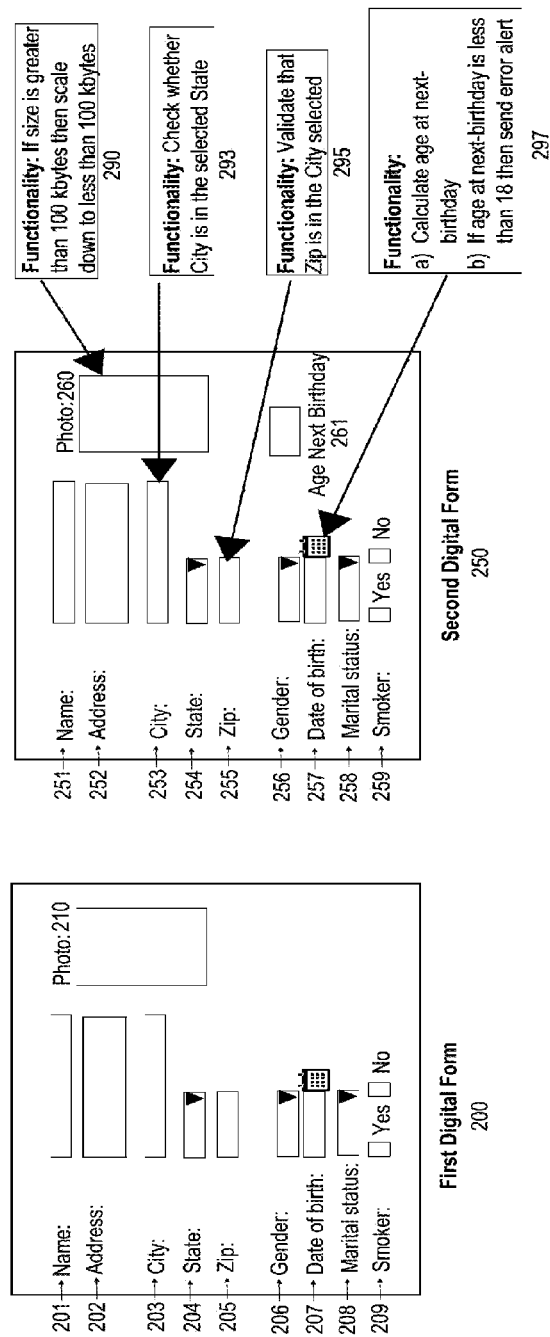

The first digital form 200 contains at least one field. Referring to FIG. 2A, various types of fields can be included in the first digital form 200. For example, the first digital form 200 can contain a text field, such as a Name field 201, wherein the user's name can be entered. Other examples of text fields include the user's address 202, the user's city of residence 203, and the user's zip code 205. Another type of field contained in the first digital form 200 can be a drop-down list field, such as the user's State of residence 204. When the user clicks on the user's State of residence 204, a drop-down list appears containing the names or abbreviations of various States (e.g., California, Georgia, Massachusetts, etc.), from which the user can select the appropriate State. Other examples of a drop-down list field can be the Gender field 206 and Marital Status field 208. Another type of field contained in the first digital form 200 can be a calendar field, such as Date of birth field 207. When the user clicks on the Date of birth field 207, a calendar can appear, from which the user can select an appropriate date. Another type of field contained in the first digital form 200 can be an image field, such as Photo field 210. When the user clicks on Photo field 210, the user can upload a photograph to the first digital form 200. Another type of field contained in the first digital form 200 can be a check box field, such as Smoker field 209. A user can click applicable boxes in a check box field. While FIGS. 2A and 2B only shows a limited set of fields, it will be understood that the first digital form 200 can contain numerous different types of fields in order to collect various different types of information. For example, the first digital form 200 could also include a radio button field or a button field. It will be understood that the formatting and fields shown in FIGS. 2A and 2B are exemplary and other variations of formatting and field options exist.

In step 105, the user modifies a field within the first digital form 200. For example, the user can upload a photograph 210 into the first digital form. In step 107, in response to the user's modification in the first digital form 200, the user's modification is displayed in a second digital form 250 on the agent device's 300 display screen 405. The second digital form 250 contains the field, e.g., in this example the second digital form contains a photograph field 260 (corresponding to photograph field 210 in the first digital form). The second digital form 250 is capable of analyzing the field by accessing functionality related to the field that the first digital form 200 is not capable of accessing, such as performing a verification of the value in the field with respect to data residing in the agent's device or with respect to other fields in the first digital form, or offering possible valid choices for the field value from which the user can select. For example, in step 109, the second digital form 250 could access functionality 290 to analyze whether the photograph 260 is greater than 100 kbytes in size. If the photograph 260 is greater than 100 kbytes in size, then in some implementations, the agent device 300 could modify the field 260 and scale down the photograph 260 to 100 kbytes or less. In this situation, the agent device's 300 modification to the field 260 in the second digital form 250 can be displayed and saved in field 210 in the first digital form 200 to the user. Alternatively, in some implementations, if the photograph 210 is greater than 100 kbytes in size, the agent device can perform step 111 and send an error alert to the user device 350; the error alert can instruct the user to scale down the photograph 210 to 100 kbytes or less. In some implementations, if the second digital form 250 does not identify any errors, then in step 113, the agent device 300 can validate the user's modification of the field. In some implementations, validation can result in the agent device 300 performing step 115, where the agent device 300 locks the field in the first digital form 200 so that the user device 350 can no longer modify the field in the first digital form 200.

In some implementations, the analyzing step 109 includes using the modification to determine the value of a second field and then displaying the value of the second field in the first digital form 200 and second digital form 250. For example, referring to FIGS. 1 and 2B, in step 105 the user can modify Date of Birth field 207. Then, in step 109, the agent device 300 can analyze the Date of Birth field 207 and determine the user's age at their next birthday. The agent device 300 can then display the user's age at their next birthday in the first digital form 200 as a second field, such as display-only field 211 ("Age Next Birthday"). Similarly, the agent device 300 can display the user's age at their next birthday in the second digital form 250 as a second field, such as display-only field 261 ("Age Next Birthday"). In the context of an insurance proposal (where the user is filling a form related to obtaining insurance), the "age next birthday" field may be useful for the underwriting process even though it is a display-only field.

FIG. 5 shows a block-flow diagram illustratively depicting another embodiment of a method for assisting a user in the process of filling out a digital form. Referring to FIGS. 3 and 5, the first step 501 of the method shown in FIG. 5 involves establishing an electronic connection between an agent device 300 (operated by an agent) and a user device 350 (operated by a user). As shown in FIG. 3, various methods exist for establishing a connection between the agent device 300 and the user device 350. For example, using communication method 320, the agent device 300 and the user device 350 establish a connection through a server 303 and the internet 302. As another example, using communication method 330, the agent device 300 and the user device 350 can establish a connection using only the internet 302. As yet another example, using communication method 340, the agent device 300 and the user device 350 can establish a connection via an intranet network 305. As yet another example, the agent device 300 and user device 350 may establish a connection via an intranet network 305 and a server 303. Once a connection is established, the agent device 300 may facilitate various methods of verbal communication, such as telephonic communication and videoconferencing.

Referring to FIGS. 2 and 5, in step 503, the agent device 300 provides the user device 350 with access to a first digital form 200. As explained previously, various types of fields can be included in the first digital form 200. The fields could include a drop-down list field, radio button field, text field, calendar field, image field, check box field, button field, etc. In step 505, a second digital form 250 is displayed on the agent device 300. The second digital form 250 can contain the fields that are included in the first digital form 200. The second digital form 250 is capable of accessing functionality related to the fields that the first digital form 200 is not capable of accessing.

As shown in step 507, the agent can modify a field in the second digital form 250. For example, the agent can enter the user's city 253 and state 254 into the second digital form 250. The agent device 300 can then analyze the agent's modification for errors, as shown in step 509. The agent device 300 can analyze the agent's modification for errors using the functionality that the second digital form 250 is capable of accessing and the first digital form 200 is not capable of accessing. For example, in step 509, the second digital form 250 can use functionality 293 to determine whether the city 253 is an actual city in state 254. If the agent device 300 determines that there is no city 253 in state 254, then the agent device 300 will display an error alert to the agent, as shown in step 511. In such a situation, the agent can again modify the city 253 and state 254. If the agent device 300 does not identify any errors, then in step 513 the modification can be validated by the agent device. In response to the agent's modification in the second digital form 250, the agent's modification is displayed in the first digital form 200, as shown in step 515. For example, the first digital form 200 can display a city 203 and state 204 that reflects the same values as the city 253 and state 254 in the second digital form 250. If the user does not identify any errors in the city 203 and state 204, then the field modification can be complete, as shown in step 520. However, if the user recognizes an error, then the user can modify the field in the first digital form 200, as shown in step 517. For example, if the user identifies that the city 203 is correct, but the state 204 is incorrect, then the user can modify the state 204. After the user modifies a field in the first digital form 200, the modification is shown in the corresponding field in the second digital form 250, as shown in step 519. The agent device can then again analyze the field for errors, and validate the field if there are no errors identified, and lock the field to prevent any further modifications of the field.

In some implementations, the analyzing step 509 includes using the agent's or user's modification to determine the value of a second field and then displaying the value of the second field in the first digital form 200 and second digital form 250. For example, referring to FIGS. 5 and 2B, in step 507 the agent can modify Date of Birth field 257. Then, in step 509, the agent device 300 can analyze the Date of Birth field 257 and determine the user's age at their next birthday. The agent device 300 can then display the user's age at their next birthday in the first digital form 200 as a second field, such as display-only field 211 ("Age Next Birthday"). Similarly, the agent device 300 can display the user's age at their next birthday in the second digital form 250 as a second field, such as display-only field 261 ("Age Next Birthday"). In the context of an insurance proposal (where the user is filling a form related to obtaining insurance), the "age next birthday" field may be useful for the underwriting process even though it is a display-only field.

Throughout the various steps 103-115 and 503-520 described above, the user and the agent can be in communicative contact using various methods (e.g., telephonic communication, videoconferencing, text messaging, use of a chatroom, etc.). This communicative contact can enhance the collaborative process of digital form filling. For example, when the user makes a modification in step 517 (FIG. 5), the user can explain to the agent why the current value in the field needs to be modified. Similarly, when an error alert is sent to the user in step 111 (FIG. 1), the agent can explain to the user what the error alert means and how to resolve the error.

It will be understood that the processes shown in steps 103-115 and 503-520 can be iterative, and that there may be many fields in a digital form. Once a field is completed and validated, the process can repeat for the next relevant field. It will also be understood that the user and the agent do not necessarily need to address fields in the order in which they appear in a digital form. For example, a user may first modify the smoker field 209 of the first digital form 200 before moving on to the date of birth field 207.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device or system. Examples of a computing device or system may include, but are not limited to, an electronic book reading device, a computer workstation, a terminal computer, a server computer, a handheld or mobile device (e.g., a tablet computer, a personal digital assistant "PDA," a mobile telephone, a Smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

As used herein, the term "mobile device" is intended to encompass any form of programmable computing device as may exist, or will be developed in the future, that implements a communication module for wireless voice and data communications, including, for example, cellular telephones, personal data assistants (PDA's), palm-top computers, laptop, and notebook computers, wireless electronic mail receivers (e.g., the BLACKBERRY™ and TREO™ devices), multimedia Internet enabled cellular telephones (e.g., the BLACKBERRY STORM™, and similar personal electronic devices that include a wireless communication module, processor and memory.

The computer device or system may also include an input device. In one example, a user of the computer device or system may enter commands and/or other information into computer device or system via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device or system via a storage device (e.g., a removable disk drive, a flash drive, etc.) and/or a network interface device. A network interface device, such as network interface device may be utilized for connecting the computer device or system to one or more of a variety of networks and/or one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device or system via a network interface device.

The computer device or system may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device or system may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A non-transitory computer readable storage medium comprising a computer readable program, wherein the computer readable program when executed on an agent device operated by an agent causes the agent device to perform the steps of:
   providing a user device with access to a first digital form, wherein the user device is operated by a user, and wherein the first digital form contains a field that can be modified by the user;
   identifying a modification to the field by the user;
   displaying the modification in a second digital form residing on the agent device, wherein the second digital form also contains the field, and wherein the second digital form is capable of accessing functionality that the first digital form is not capable of accessing; and
   analyzing the modification using the functionality the second digital form is capable of accessing.

2. The non-transitory computer readable storage medium of claim 1, wherein the analyzing step comprises identifying errors in the modification, and wherein the agent device performs the further step of sending an error alert to the user device after identification of an error.

3. The non-transitory computer readable storage medium of claim 1, wherein the analyzing step comprises using the modification to determine the value of a second field, and further comprising the step of displaying the value of the second field in the first digital form and the second digital form.

4. The non-transitory computer readable storage medium of claim 1, wherein the field can no longer be modified after the agent device performs the step of analyzing the modification using the functionality the second digital form is capable of accessing.

5. The non-transitory computer readable storage medium of claim 1, wherein the modification is not sent to an intermediate server.

6. The non-transitory computer readable storage medium of claim 1, wherein the field is selected from the group consisting of: (i) drop-down list field; (ii) radio button field; (iii) text field; (iv) calendar field; (v) image field; (vi) check box field; and (vii) button field.

7. The non-transitory computer readable storage medium of claim 1, wherein the field in the second digital form can be modified by the agent, and wherein the agent device performs the further steps of identifying an agent's modification to the field in the second digital form, and instructing the user device to display the agent's modification in the field in the first digital form.

8. The non-transitory computer readable storage medium of claim 1, wherein the first digital form is not capable of accessing functionality capable of identifying errors in the modification, and the second digital form is capable of accessing functionality capable of identifying errors in the modification.

9. A method of agent-assisted digital form filling, the method comprising the steps of:
   providing, by an agent device operated by an agent, a user device with access to a first digital form, wherein the user device is operated by a user, and wherein the first digital form contains a field that can be modified by the user;
   identifying, by the agent device, a modification to the field by the user;
   displaying, by the agent device, the modification in a second digital form residing on the agent device, wherein the second digital form also contains the field, and wherein the second digital form is capable of accessing functionality that the first digital form is not capable of accessing; and
   analyzing, by the agent device, the modification using the functionality the second digital form is capable of accessing.

10. The method of claim 9, wherein the analyzing step comprises identifying errors in the modification, and wherein the agent device performs the further step of sending an error alert to the user device after identification of an error.

11. The method of claim 9, wherein the analyzing step comprises using the modification to determine the value of a second field, and further comprising the step of displaying the value of the second field in the first digital form and the second digital form.

12. The method of claim 9, wherein the field can no longer be modified by the user after the agent device performs the step of analyzing the modification using the functionality the second digital form is capable of accessing.

13. The method of claim 9, wherein the modification is not sent to an intermediate server.

14. The method of claim 9, wherein the field is selected from the group consisting of: (i) drop-down list field; (ii) radio button field; (iii) text field; (iv) calendar field; (v) image field; (vi) check box field; and (vii) button field.

15. An agent device capable of being operated by an agent, comprising:
- a processor;
- memory storing computer-readable instructions that, when executed by the processor, cause the agent device to perform the steps of:
- providing a user device with access to a first digital form, wherein the user device is operated by a user, and wherein the first digital form contains a field that can be modified by the user;
- identifying a modification to the field by the user;
- displaying the modification in a second digital form residing on the agent device, wherein the second digital form also contains the field, and wherein the second digital form is capable of accessing functionality that the first digital form is not capable of accessing; and
- analyzing the modification using the functionality the second digital form is capable of accessing.

16. The agent device of claim 15, wherein the analyzing step comprises identifying errors in the modification, and wherein the agent device performs the further step of sending an error alert to the user device after identification of an error.

17. The agent device of claim 15, wherein the analyzing step comprises using the modification to determine the value of a second field, and further comprising the step of displaying the value of the second field in the first digital form and the second digital form.

18. The agent device of claim 15, wherein the field can no longer be modified by the user after the agent device performs the step of analyzing the modification using the functionality the second digital form is capable of accessing.

19. The agent device of claim 15, wherein the field is selected from the group consisting of: (i) drop-down list field; (ii) radio button field; (iii) text field; (iv) calendar field; (v) image field; (vi) check box field; and (vii) button field.

20. A non-transitory computer readable storage medium comprising a computer readable program, wherein the computer readable program when executed on an agent device operated by an agent causes the agent device to perform the steps of:
- providing a user device with access to a first digital form, wherein the user device is operated by a user, and wherein the first digital form contains a field that can be modified by the user;
- displaying a second digital form on the agent device, wherein the second digital form residing on the agent device and also contains the field, and wherein the second digital form is capable of accessing functionality that the first digital form is not capable of accessing;
- receiving an agent's modification to the field in the second digital form, wherein the agent's modification is made by the agent; and
- instructing the user device to display the agent's modification in the field in the first digital form.

* * * * *